UNITED STATES PATENT OFFICE.

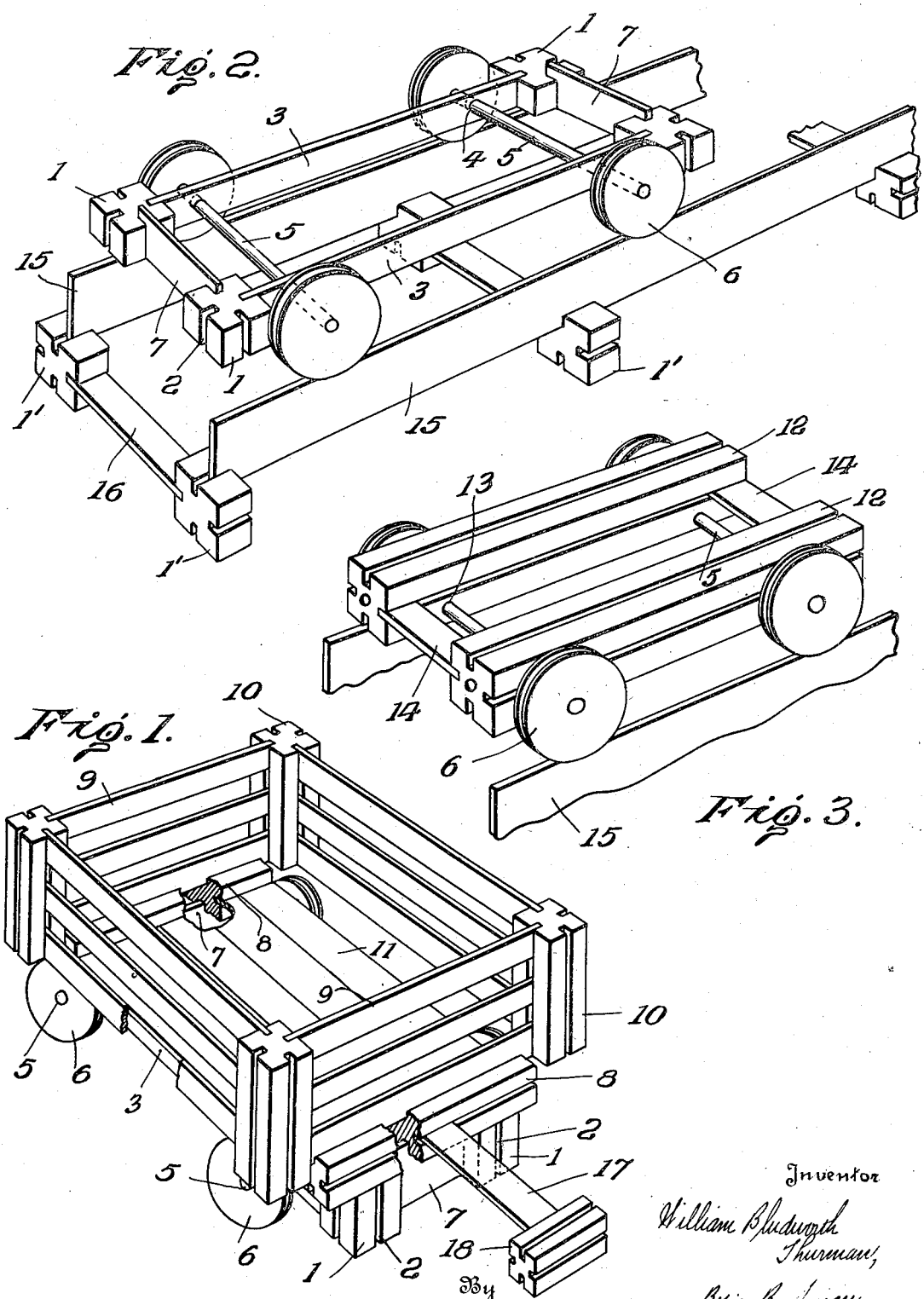

WILLIAM BLUDWORTH THURMAN, OF MADERA, CALIFORNIA.

STRUCTURAL TOY.

1,242,273.  Specification of Letters Patent.  Patented Oct. 9, 1917.

Application filed February 15, 1917. Serial No. 148,782.

*To all whom it may concern:*

Be it known that I, WILLIAM BLUDWORTH THURMAN, a citizen of the United States, and a resident of Madera, in the county of Madera and State of California, have invented certain new and useful Improvements in Structural Toys, of which the following is a specification.

My invention relates to structural toys and has as its principal object the provision of simple and novel combinations formed of longitudinally grooved rectangular blocks together with the necessary elements for holding said longitudinally grooved blocks together and for forming a slot in combination therewith.

A further object of my invention is to provide a combination of longitudinally grooved rectangular blocks with coöperating elements which can be built up to form a trail or track and a structure run on said track.

A further object of my invention is to provide a novel and convenient means of building up a truck and cart thereon from longitudinally slotted blocks and suitable connecting elements.

In the accompanying drawing, Figure 1 is a perspective view of a truck made according to my invention having a cart body built up thereon.

Fig. 2 is a perspective view of a truck similar to that shown in Fig. 1, but without the cart body thereon and mounted to run on a track.

Fig. 3 is a perspective view showing a different form of truck also mounted to run on a track.

It will be seen that Fig. 1 of this application is identical with original Fig. 1 of my prior application #73723.

Throughout the separate views the same part is designated by the same reference character.

Referring more particularly to the drawing, 1—1 are relatively short rectangular blocks having longitudinal grooves 2 in the middle of each space. There are four such blocks 1 placed at the four corners of a truck, the four blocks 1 being arranged with the grooves 2 in vertical position. 3—3 are parallel side slats each held by friction in two of the slot structures 2 in the blocks 1, said slats 3 serving as the side pieces for a truck and having apertures such as 4 therein to receive axle dowels such as 5 on the ends of which are frictionally mounted pairs of wheels such as 6.

Extending at right angles to the stringers 3 are a pair of spacing members 7—7 at opposite ends of the truck, members 7—7 frictionally engaging other sets of parts such as 2 in the corner members 1, so that members 7—7 are held at right angles to the members 3—3 and the truck as a whole is held sufficiently rigid for rolling on the floor or on a track when children are playing with the same. Preferably the members 7—7 are made sufficiently wide as shown in Fig. 2 so that they may engage in one of the longitudinal slots of a block such as 8, one of which may be placed at each end of the truck. In the top groove or slot of the block 8, I may place a slat such as 9 and at the ends of the slat 9 place two upright blocks such as 10, connecting the blocks 10 both transversely and longitudinally of the truck by means of additional slats so as to form the sides and ends of a cart body. Moreover, the longitudinal slot on the inner sides of the block 8 may be connected by wide strips or slats such as 11, so as to form the bottom of the cart body.

Referring more particularly to Fig. 3, I have shown therein a second form of truck comprising rectangular blocks such as 12 having longitudinal slots therein similar to the slot 2 of the blocks 1, 8, and 10, said blocks 12 having transverse apertures such as 13 therein for receiving the axle dowels 5. The blocks 12—12 are placed and held in proper relative position by means of two horizontal slats or cross pieces such as 14. However, it will be understood that the blocks 12—12 are similar to blocks previously described and claimed in my prior application #73,723 and this block and the truck of which it is a part are not specifically claimed herein. The truck shown in Figs. 2 and 3 are shown also as mounted to run on tracks and these tracks are perfectly made as shown in Fig. 2 by longitudinal slats or stringers such as 15 which are held in vertical position by frictional engagement with parts in blocks such as 1'. The blocks 1' are suitably spaced by horizontal strips such as 16 which are frictionally held in the slots on the inner faces of the blocks 1', the strips 16 being so related to the strips 7 and 14 that the wheels 6 turn on the strips 15.

Referring again to Fig. 1, it will be noted that I may place a strip 17 in the front part of the block 8 to represent the tongue of a wagon and a cross block 18 may be placed at the forward end of the strip 17 so that the wagon may be pulled by one playing with it.

Having thus described my invention, I claim:

1. A toy truck comprising rectangular blocks having longitudinal grooves therein placed at the four corners of the truck and having their grooves substantially vertical, a pair of transverse strips facing said blocks at the end of the truck, relatively long vertical transverse strips facing said blocks lengthwise of the truck and having apertures therein for receiving axle dowels, said strips being held in said blocks by frictional attachment with the sides of said grooves, and wheels frictionally held at the ends of said dowels.

2. The combination with a truck having longitudinal members provided with transverse alined holes for receiving axle dowels, means for holding said longitudinal members in spaced relation, wheels frictionally held on the ends of said dowels, and a track for supporting said wheels, said track comprising rectangular blocks having longitudinal slots therein, track members frictionally held in said slots in a vertical position, and means for spacing said blocks to bring said track members the right distance apart to receive said wheels.

3. The combination with a truck having longitudinal members provided with transverse alined holes for receiving axle dowels, means for holding said longitudinal members in spaced relation, wheels frictionally held on the ends of said dowels, and a track for supporting said wheels, said track comprising rectangular blocks having longitudinal slots therein, track members frictionally held in said slots in a vertical position, and means for spacing said blocks to bring said track members the right distance apart to receive said wheels, the joints between two longitudinal track members coming within a slot of one of said blocks.

4. A toy cart comprising in combination a truck having four rectangular longitudinally grooved blocks arranged at the corners of the truck, vertical transverse slats frictionally held in the grooves of said blocks and extending above the upper ends thereof, longitudinal members having alined apertures therein for receiving axle dowels, said longitudinal members being held also in the slot in said blocks, a pair of transversely arranged rectangular slotted blocks held frictionally by engagement between the slots therein and the upper edge of said first mentioned transverse members, floor members held in certain slots in said transverse blocks, and a cart body or top held by certain other slots in said transverse blocks.

WILLIAM BLUDWORTH THURMAN.